United States Patent
Lee et al.

(10) Patent No.: US 11,927,793 B2
(45) Date of Patent: Mar. 12, 2024

(54) DOUBLE-SIDED DISPLAY DEVICE

(71) Applicant: InnoLux Corporation, Miao-Li County (TW)

(72) Inventors: Yi-Hui Lee, Miao-Li County (TW); Kuan-Chou Chen, Miao-Li County (TW); Yung-Chih Cheng, Miao-Li County (TW)

(73) Assignee: INNOLUX CORPORATION, Chu-Nan Miao-Li County (TW)

( * ) Notice: Subject to any disclaimer, the term of this patent is extended or adjusted under 35 U.S.C. 154(b) by 0 days.

(21) Appl. No.: 18/176,090

(22) Filed: Feb. 28, 2023

(65) Prior Publication Data

US 2023/0314693 A1    Oct. 5, 2023

Related U.S. Application Data

(60) Provisional application No. 63/325,978, filed on Mar. 31, 2022.

(30) Foreign Application Priority Data

May 6, 2022 (CN) .......................... 202210484764.7

(51) Int. Cl.
*F21V 8/00* (2006.01)

(52) U.S. Cl.
CPC ......... *G02B 6/0063* (2013.01); *G02B 6/0036* (2013.01); *G02B 6/0038* (2013.01); *G02B 6/0051* (2013.01)

(58) Field of Classification Search
CPC .. G02B 6/0063; G02B 6/0036; G02B 6/0038; G02B 6/0051
See application file for complete search history.

(56) References Cited

U.S. PATENT DOCUMENTS

2012/0169967 A1 * 7/2012 Han ...................... G02F 1/1333
349/62

FOREIGN PATENT DOCUMENTS

| CN | 1639618 A | 7/2005 | |
|---|---|---|---|
| CN | 102540568 A | 7/2012 | |
| CN | 106292044 A * | 1/2017 | ............... G02B 6/00 |

* cited by examiner

*Primary Examiner* — Mary Ellen Bowman
(74) *Attorney, Agent, or Firm* — MUNCY, GEISSLER, OLDS & LOWE, PC (57) ABSTRACT

A double-sided display device includes a first panel, a second panel, a light guide plate and a light source. The second panel is arranged opposite to the first panel. The light guide plate is arranged between the first panel and the second panel, and includes a main body portion including a first surface and a second surface, a first pattern arranged on the first surface, and a second pattern arranged on the second surface. The light source is arranged adjacent to the light guide plate. The first pattern is different from the second pattern.

19 Claims, 5 Drawing Sheets

DOUBLE-SIDED DISPLAY DEVICE

CROSS-REFERENCE TO RELATED APPLICATIONS

This application claims the benefit of filing date of U.S. Provisional Application Ser. No. 63/325,978 filed Mar. 31, 2022 under 35 USC § 119(e)(1), and also claims the benefit of the Chinese Patent Application Serial Number 202210484764.7, filed on May 6, 2022, the subject matter of which is incorporated herein by reference.

BACKGROUND

Field of the Disclosure

The present disclosure provides a double-sided display device, especially a double-sided display device that shares a light guide plate.

Description of Related Art

With the progress of science and technology, various display devices have been developed to meet the needs of consumers. A double-sided display device is such a display device that can simultaneously generate outgoing light on both sides for screen display, and can provide diverse and convenient applications. In most current designs, the double-sided display device is achieved by assembling two independent display panels arranged in a back-to-back manner.

However, the current double-sided display devices on the market still have disadvantages such as large overall device thickness or high power consumption. Therefore, there is an urgent need to provide a double-sided display device in order to mitigate and/or obviate the prior defects.

SUMMARY

The present disclosure provides a double-sided display device, which comprises: a first panel; a second panel arranged opposite to the first panel; a light guide plate arranged between the first panel and the second panel, wherein the light guide plate includes: a main body portion including a first surface and a second surface; a first pattern arranged on the first surface; and a second pattern arranged on the second surface; and a light source arranged adjacent to the light guide plate, wherein the first pattern is different from the second pattern.

Other novel features of the disclosure will become more apparent from the following detailed description when taken in conjunction with the accompanying drawings.

DETAILED DESCRIPTION OF EMBODIMENT

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to . . . ".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the measurement method for the distance may be obtained by using an optical microscope, and the distance may be obtained by measuring the cross-sectional image in the electron microscope, but it is not limited thereto. In addition, any two values or directions used for comparison may have certain errors. In addition, the terms "the given range is from the first value to the second value" and "the given range falls within the range from the first value to the second value" indicate that the given range includes the first value, the second value and other values between the first value and the second value.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

Figure 1A:
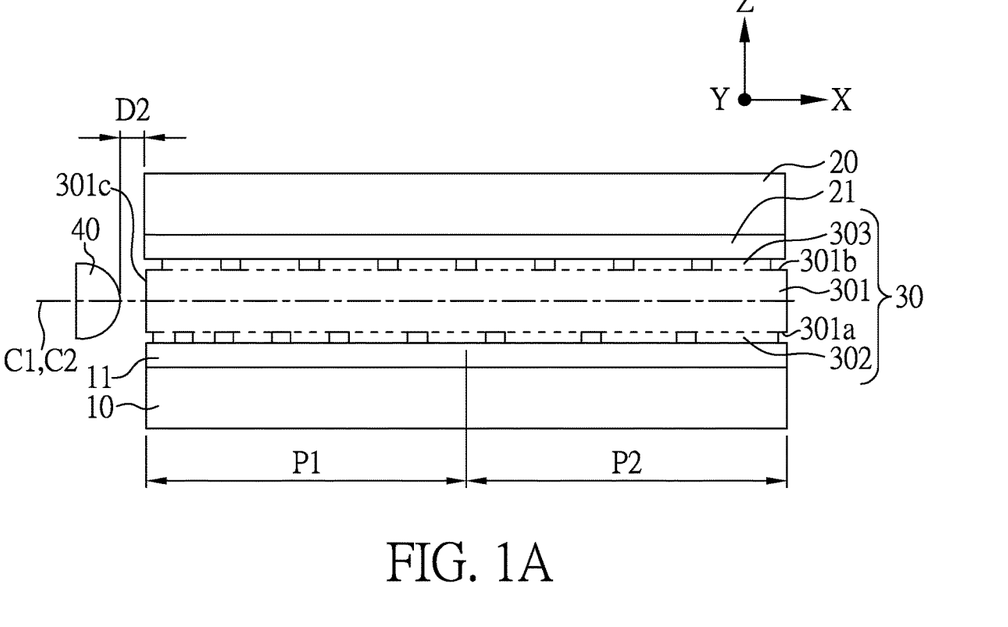
FIG. 1A is a schematic side view of a double-sided display device according to an embodiment of the present disclosure.
Figure 1B:
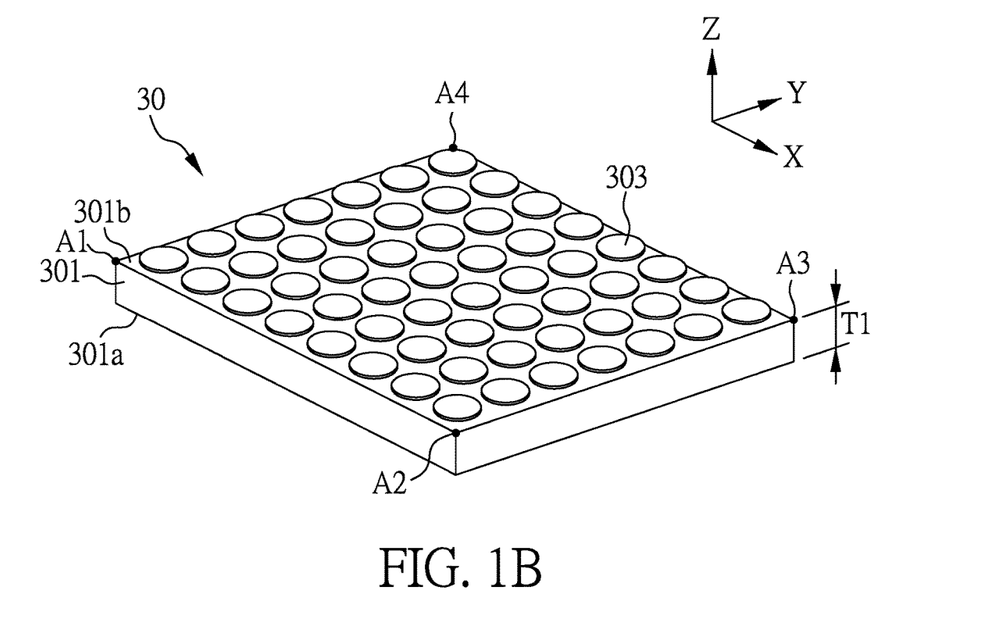
FIG. 1B is a three-dimensional schematic diagram of a light guide plate according to an embodiment of the present disclosure.

FIG. 1A is a schematic side view of a double-sided display device according to an embodiment of the present disclosure, and FIG. 1B is a three-dimensional schematic diagram of a light guide plate according to an embodiment of the present disclosure.

As shown in FIG. 1A and FIG. 1B, the double-sided display device of the present disclosure may include a first panel 10, a second panel 20 arranged opposite to the first panel 10, a light guide plate 30 arranged between the first panel 10 and the second panel 20, and a light source 40 arranged adjacent to the light guide plate 30. The light guide plate 30 may include a main body portion 301 having a first surface 301a and a second surface 301b, a first pattern 302 arranged on the first surface 301a, and a second pattern 303 arranged on the second surface 301b, wherein the first pattern 302 is different from the second pattern 303. The double-sided display device of the present disclosure may reduce the arrangement of multiple light guide plates, reflectors, or other components by sharing one light guide plate 30, so as to achieve the effects of thinning, lightening, or reducing power consumption. In addition, with the design of the first pattern 302 and the second pattern 303 on the light guide plate 30, the amount of light emitted from both sides of the light guide plate 30 may be adjusted, so that the display panels on both sides of the light guide plate 30 have different display effects, which may be applied in various fields.

In the present disclosure, the main body portion 301 of the light guide plate 30 includes a first surface 301a, a second surface 301b opposite to the first surface 301a, and a side surface 301c connected to the first surface 301a and the second surface 301b. As shown in FIG. 1B, in the top view direction of the light guide plate 30, the coplanar plane formed by four corners A1, A2, A3 and A4 of the light guide plate 30 define the second surface 301b described in the present disclosure. Similarly, although not shown in the figure, in the bottom view direction of the light guide plate 30, the coplanar plane formed by the other four corners of the light guide plate 30 may define the first surface 301a described in the present disclosure. In the present disclosure, as shown in FIG. 1A, in a side view, the light guide plate 30 has a center line C1 in the normal direction Z perpendicular to the light guide plate 30 (i.e., in the first direction X), wherein the distance from the center line C1 to the first surface 301a is equal to the distance from the center line C1 to the second surface 301b. Herein, the center line C1 is an imaginary reference line, which may extend along the first direction X perpendicular to the normal direction Z of the light guide plate 30, or may be developed along the second direction Y perpendicular to the normal direction Z of the light guide plate 30 as a central surface.

In the present disclosure, the first pattern 302 and the second pattern 303 may be respectively arranged on the first surface 301a and the second surface 301b, so that the upper surface and the lower surface of the light guide plate 30 become rough surfaces, which may improve the brightness of the first panel 10 and/or the second panel 20 or may improve display quality. In one embodiment of the present disclosure, each of the first pattern 302 and the second pattern 303 may include a protruding structure, but the present disclosure is not limited thereto. In other embodiments of the present disclosure, each of the first pattern 302 and the second pattern 303 may include a recessed structure. The "protruding structure" means that the patterns respectively protrude in directions away from the center line C1 of the light guide plate 30. The "recessed structure" means that the patterns are respectively recessed toward the direction close to the center line C1 of the light guide plate 30.

In the present disclosure, the "first pattern is different from the second pattern" may refer to the first pattern 302 and the second pattern 303 are different in terms of shape, size, position, density, or a combination thereof, but the present disclosure is not limited thereto. In one embodiment of the present disclosure, as shown in FIG. 1A, the density of the first pattern 302 is different from that of the second pattern 303. In other words, the density of the first pattern 302 may be greater than that of the second pattern 303, or the density of the first pattern 302 may be smaller than the density of the second pattern 303. In one embodiment of the present disclosure, the size of the first pattern 302 is different from that of the second pattern 303. In other words, the size of the first pattern 302 may be smaller than that of the second pattern 303, or the size of the first pattern 302 may be greater than that of the second pattern 303. In one embodiment of the present disclosure, the shape of the first pattern 302 may be different from that of the second pattern 303.

In one embodiment of the present disclosure, as shown in FIG. 1A, the light guide plate 30 may include a first part P1 and a second part P2. The first part P1 is closer to the light source 40 than the second part P2, and the light source 40 is arranged corresponding to the side surface 301c of the main body portion 301. The density of the first pattern 302 in the first part P1 is different from the density of the first pattern 302 in the second part P2. More specifically, the density of the first pattern 302 in the first part P1 adjacent to the light source 40 may be smaller than the density of the second part P2 of the first pattern 302 away from the light source 40. In the present disclosure, the "density of pattern" refers to the area occupied by the pattern per unit area in a plan view. In one embodiment of the present disclosure, the size of the first pattern 302 in the first part P1 may be smaller than the size of the first pattern 302 in the second part P2, so as to improve the uniformity of light output from the light guide plate. In addition, in one embodiment of the present disclosure, as shown in FIG. 1A, the area of the first part P1 is substantially equal to the area of the second part P2, but the present disclosure is not limited thereto. In other embodiments, the area of the first part P1 may be greater or smaller than that of the second portion P2.

In the present disclosure, as shown in FIG. 1A, the double-sided display device may further include a first diffusion sheet 11, and a second diffusion sheet 21. The first diffusion sheet 11 is arranged between the first panel 10 and the light guide plate 30, and the second diffusion sheet 21 is arranged between the second panel 20 and the light guide plate 30. The haze of the first diffusion sheet 11 and the haze of the second diffusion sheet 21 may each be between 90% and 97% (90%≤haze≤97%), and the haze of one diffusion sheet 11 may be the same as or different from the haze of the second diffusion sheet 21. When the haze of the diffusion is too large, the brightness of the display panel will be reduced and, when the haze of the diffusion sheet is too small, the display panel is likely to produce interference stripes such as moiré patterns, which will affect the quality of the display. Therefore, when the haze of the diffusion sheet is within the aforementioned range, a balance between display quality and brightness may be achieved.

In the present disclosure, the light source 40 may be provided with an optical axis C2 extending along the normal direction Z perpendicular to the light guide plate 30 (i.e., along the first direction X). The "optical axis" refers to the center line of the light beam emitted by the light source 40, which is an imaginary reference line. In the present disclosure, the distance D1 between the optical axis C2 and the center line C1 in the normal direction Z of the light guide plate 30 may satisfy the following formula:

$$0 \leq D1 \leq \tfrac{1}{4} \times T1,$$

where D1 represents the distance between the optical axis and the center line, and T1 represents the thickness of the light guide plate. In the present disclosure, the thickness T1 of the light guide plate 30 is the distance between the first surface 301a and the second surface 301b in the normal direction Z of the light guide plate 30.

In one embodiment of the present disclosure, as shown in FIG. 1A, the optical axis C2 may overlap with the center line C1 of the light guide plate 30, and thus the distance D1 between the optical axis C2 and the center line C1 may be 0 microns (μm). By adjusting the distance D1 between the optical axis C2 and the center line C1, the uniformity and/or brightness of the light output on both sides of the light guide plate 30 may be adjusted to achieve different display effects for the first panel 10 and the second panel 20, so that the double-sided display device of the present disclosure may be applied in situations where different display effects are required on both sides.

In addition, in the present disclosure, there may be a distance D2 between the light source 40 and the light guide plate 30 and, more specifically, the distance D2 may refer to such a distance between the light source 40 and the side surface of the light guide plate 30 in the extending direction of the center line C1 of the light guide plate 30 (i.e., in the first direction X), wherein the distance D2 may be between 0.5 millimeters (mm) and 7.7 millimeters (mm) (0.5 mm≤D2≤7.7 mm). By adjusting the distance D2 between the light source 40 and the light guide plate 30, the hot spot phenomenon (the light emitted by the light source 40 is excessively concentrated on certain parts of the side surface 301c to form obvious uneven brightness and darkness) may be mitigated, thereby improving the light uniformity of the light guide plate 30.

In the present disclosure, the light source 40 may include a light emitting diode (LED), and the light emitting diode may, for example, include an organic light emitting diode (OLED), a sub-millimeter light emitting diode (mini LED), a micro light emitting diode (micro LED) or a quantum dot light emitting diode (quantum dot LED, which may include QLED, QDLED), fluorescence, phosphor or other suitable materials, or a combination thereof, but the present disclosure is not limited thereto. In the present disclosure, the first panel 10 and the second panel 20 may be any type of display panel requiring a backlight, such as a liquid crystal panel, an electro-wetting panel, etc., but it is not limited thereto. Furthermore, in the present disclosure, the first panel 10 and the second panel 20 may have the same or different forms, but the present disclosure is not limited thereto.

Figure 2:
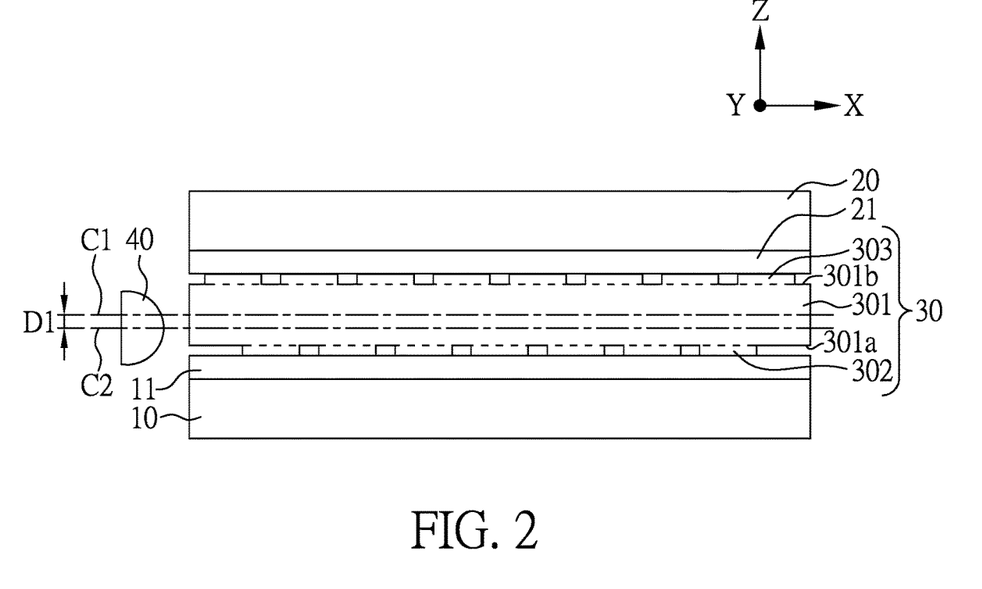
FIG. 2 is a schematic side view of a double-sided display device according to an embodiment of the present disclosure.

FIG. 2 is a schematic side view of a double-sided display device according to an embodiment of the present disclosure. The double-sided display device in FIG. 2 is similar to that in FIG. 1A and FIG. 1B, except for the following differences.

As shown in FIG. 2, the first pattern 302 is similar to the second pattern 303 in shape and size, but the arrangement positions are different. Therefore, in the normal direction Z of the light guide plate 30, at least part of the first pattern 302 and the second pattern 303 may not overlap.

In addition, the optical axis C2 may not overlap with the center line C1 of the light guide plate 30 and, more specifically, the distance D1 between the optical axis C2 and the center line C1 may be greater than 0 microns, and smaller than or equal to ¼ thickness of the light guide plate 30. By adjusting the distance D1 between the optical axis C2 and the center line C1, the light uniformity and/or brightness on both sides of the light guide plate 30 may be adjusted, so that the display effects of the first panel 10 and the second panel 20 are different.

Figure 3:
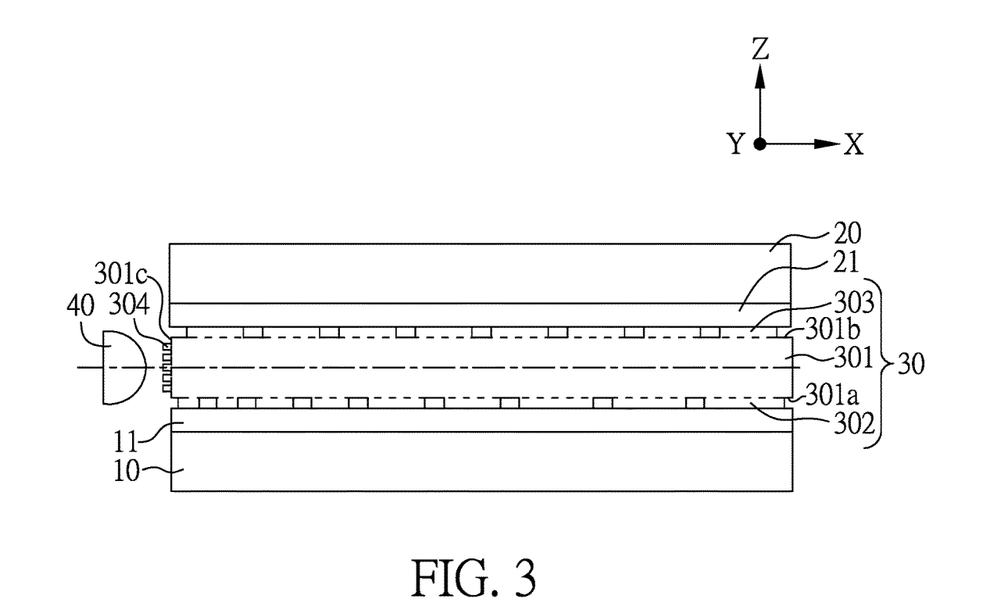
FIG. 3 is a schematic side view of a double-sided display device according to an embodiment of the present disclosure.

FIG. 3 is a schematic side view of a double-sided display device according to an embodiment of the present disclosure. The double-sided display device in FIG. 3 is similar to that in FIG. 1A and FIG. 1B, except for the following differences.

As shown in FIG. 3, the light guide plate 30 may include a third pattern 304 arranged on the side surface 301c. The third pattern 304 may be the same as or different from the first pattern 302 and/or the second pattern 303, and the third pattern 304 may be used to mitigate the aforementioned hot spot phenomenon, increase the brightness of the display panel, or improve the display quality.

Figure 4:
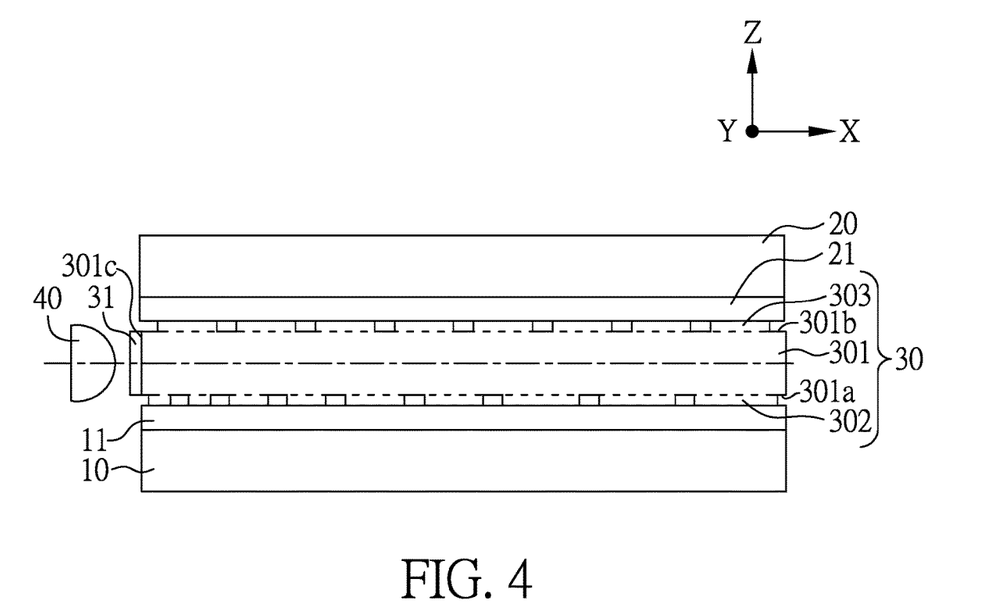
FIG. 4 is a schematic side view of a double-sided display device according to an embodiment of the present disclosure.

FIG. 4 is a schematic side view of a double-sided display device according to an embodiment of the present disclosure. The double-sided display device in FIG. 4 is similar to that in FIG. 1A and FIG. 1B, except for the following differences.

As shown in FIG. 4, the double-sided display device may further include a third diffusion sheet 31 arranged between the light source 40 and the light guide plate 30 and, more specifically, the third diffusion sheet 31 may be arranged on the side surface 301c of the light guide plate 30, thereby mitigating the hot spot phenomenon, increasing the brightness of the display panel or improving the display quality. In addition, the haze of the third diffusion sheet 31 may be the same as or different from that of the first diffusion sheet 11 and/or that of the second diffusion sheet 21, while a detailed description is deemed unnecessary.

Figure 5A:
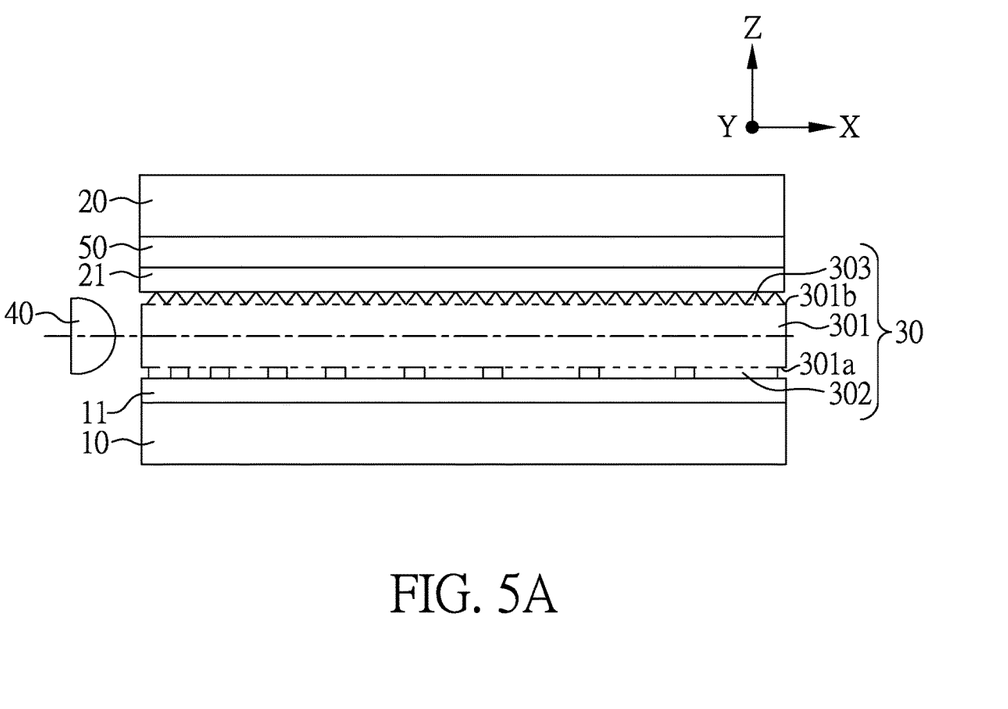
FIG. 5A is a schematic side view of a double-sided display device according to an embodiment of the present disclosure.
Figure 5B:
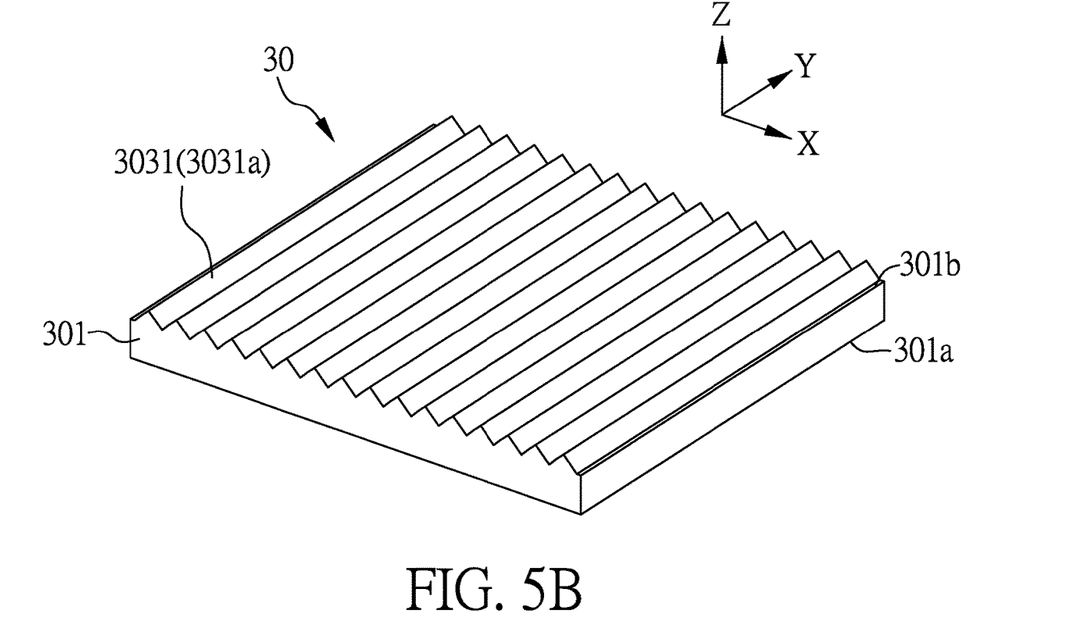
FIG. 5B is a three-dimensional schematic diagram of a light guide plate according to an embodiment of the present disclosure.
Figure 5C:
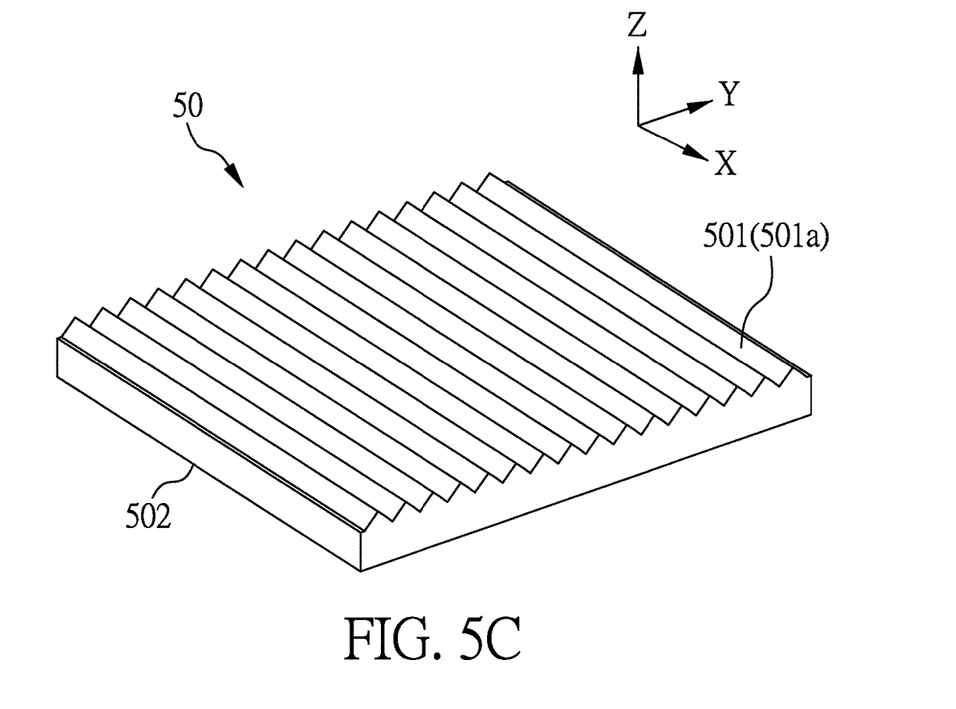
FIG. 5C is a three-dimensional schematic diagram of an optical element according to an embodiment of the present disclosure.

FIG. 5A is a schematic side view of a double-sided display device according to an embodiment of the present disclosure, FIG. 5B is a three-dimensional schematic diagram of a light guide plate according to an embodiment of the present disclosure, and FIG. 5C is a three-dimensional schematic diagram of an optical element according to an embodiment of the present disclosure, wherein FIG. 5A and FIG. 5B are similar to FIG. 1A and FIG. 1B except for the following differences.

As shown in FIG. 5A and FIG. 5B, the second pattern 303 may include a first prism structure 3031, and the first prism structure 3031 faces the second panel 20. More specifically, the first prism structure 3031 may have a plurality of first strip structures 3031a, and the plurality of first strip structures 3031a are arranged on the second surface 301b along a first direction X. The "first prism structure faces second panel" indicates that the first strip structure 3031a is closer to the second panel than the first surface 301a. In addition, the first strip structure 3031a may extend along a second direction Y, wherein the second direction Y is perpendicular to the first direction X. The extending direction of the first prism structure 3031 refers to the extending direction of the first strip structure 3031a, and thus, in an embodiment of the present disclosure, the extending direction of the first prism structure 3031 may be parallel to the second direction Y, but the present disclosure is not limited thereto. In some embodiments, the extending direction of the first prism structure 3031 may be different and not perpendicular to the first direction X.

In the present disclosure, as shown in FIG. 5A, the double-sided display device may further include an optical element 50 arranged on the second diffusion sheet 21 and, more specifically, the optical element 50 may be arranged between the second diffusion sheet 21 and the second panel 20, but it is not limited thereto. In some embodiments, the second diffusion sheet 21 may be disposed between the optical element 50 and the second panel 20. As shown in FIG. 5C, the optical element 50 may have a second prism structure 501, and the second prism structure 501 may have a plurality of second strip structures 501a and a surface 502 opposite to the plurality of second strip structures 501a. The second prism structure 501 may face the light guide plate 30 or the second panel 20 and, more specifically, the second strip structure 501a may be closer to the light guide plate 30 or the second panel 20 than the surface 502. In one embodiment of the present disclosure, the second prism structure 501a may face the second panel 20, but the present disclosure is not limited thereto. In some embodiments, the optical element 50 may be a prism film, but it is not limited thereto.

In addition, the second strip structure 501a may extend along the first direction X, and the extending direction of the second prism structure 501 refers to the extending direction of the second strip structure 501a, and thus the extending direction of the second prism structure 501 may be parallel to the first direction X. In the present disclosure, as shown in FIG. 5B and FIG. 5C, the extending direction of the first prism structure 3031 (e.g., the second direction Y) is different from the extending direction of the second prism structure 501 (e.g., the first direction X). In one embodiment of the present disclosure, the extending direction of the first prism structure 3031 (e.g., the second direction Y) may be perpendicular to the extending direction of the second prism structure 501 (e.g., the first direction X), but the present disclosure is not limited thereto. In some embodiments, the extending direction of the second prism structure 501 is different from the first direction X and the second direction Y in FIG. 5C.

Figure 6:
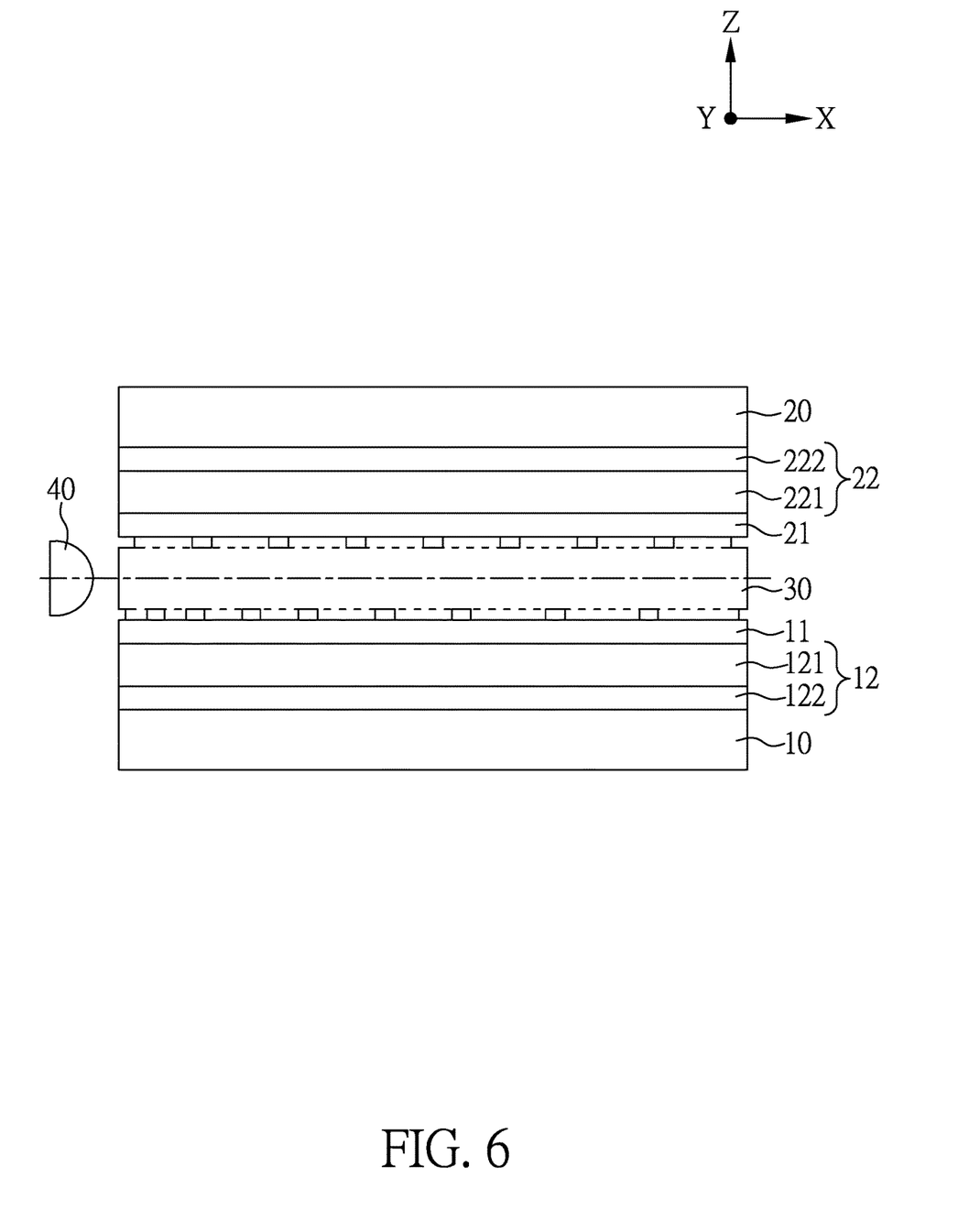
FIG. 6 is a schematic side view of a double-sided display device according to an embodiment of the present disclosure.

FIG. 6 is a schematic side view of a double-sided display device according to an embodiment of the present disclosure. The double-sided display device in FIG. 6 is similar to that in FIG. 1A and FIG. 1B, except for the following differences.

As shown in FIG. 6, a first optical film set 12 may optionally be included between the first diffusion sheet 11 and the first panel 10, and the first optical film set 12 may include a brightness enhancement film, a diffusion film, other optical films, or a combination thereof. In addition, the first optical film set 12 may be composed of single-layer films with different or similar functions, or may be a composite film, and the composite film may be provided with functions such as diffusion, brightening, or concealment, but the present disclosure is not limited thereto.

Similarly, a second optical film set 22 may also be optionally included between the second diffusion sheet 21 and the second panel 20, wherein the second optical film set 22 is similar to the first optical film set 12 and thus a repeated description is deemed unnecessary. In addition, the first optical film set 12 and the second optical film set 22 may be the same or different, while the display effects of the first panel 10 and the second panel 20 may be adjusted by arranging different optical film sets. In one embodiment of the present disclosure, the first optical film set 12 may include a brightness enhancement film 121 and a diffusion film 122 that are arranged between the first panel 10 and the light guide plate 30. Similarly, the second optical film set 22 may include a brightness enhancement film 221 and a diffusion film 222 that are arranged between the second panel 20 and the light guide plate 30, but the present disclosure is not limited thereto.

The aforementioned specific embodiments should be interpreted as merely illustrative, and not limiting the rest of the present disclosure in any way, and the features of different embodiments may be mixed and matched as long as they do not conflict with each other.

The invention claimed is:

1. A double-sided display device, comprising:
    a first panel;
    a second panel arranged opposite to the first panel;
    a light guide plate arranged between the first panel and the second panel, wherein the light guide plate includes:
        a main body portion including a first surface and a second surface;
        a first pattern arranged on the first surface; and
        a second pattern arranged on the second surface; and
    a light source arranged adjacent to the light guide plate, wherein the first pattern is different from the second pattern,
    wherein the light source has an optical axis, the light guide plate has a center line perpendicular to a normal direction of the light guide plate, and a distance between the optical axis and the center line satisfies:

$$0 \leq D1 \leq \tfrac{1}{4} \times T1,$$

where D1 represents the distance between the optical axis and the center line, and T1 represents a thickness of the light guide plate.

2. The double-sided display device as claimed in claim 1, wherein, in the normal direction of the light guide plate, at least part of the first pattern does not overlap with the second pattern.

3. The double-sided display device as claimed in claim 1, wherein a density of the first pattern is different from that of the second pattern.

4. The double-sided display device as claimed in claim 1, wherein the light guide plate includes a first part and a second part, and the first part is closer to the light source than the second part, in which a density of the first pattern in the first part is different from that of the first pattern in the second part.

5. The double-sided display device as claimed in claim 1, wherein a distance between the light source and the light guide plate is between 0.5 mm and 7.7 mm.

6. The double-sided display device as claimed in claim 1, further comprising a first diffusion sheet arranged between the first panel and the light guide plate, wherein a haze of the first diffusion sheet is between 90% and 97%.

7. The double-sided display device as claimed in claim 1, wherein the main body portion includes a side surface connected to the first surface and the second surface, and the light guide plate includes a third pattern arranged on the side surface.

8. The double-sided display device as claimed in claim 1, wherein the second pattern includes a first prism structure.

9. The double-sided display device as claimed in claim 8, further comprising a second diffusion sheet arranged between the second panel and the light guide plate; and an optical element arranged between the second diffusion sheet and the second panel, wherein the optical element has a second prism structure.

10. The double-sided display device as claimed in claim 1, wherein each of the first pattern and the second pattern includes a protruding structure.

11. The double-sided display device as claimed in claim 1, wherein a size of the first pattern is different from that of the second pattern.

12. The double-sided display device as claimed in claim 11, wherein the light guide plate includes a first part and a second part, the first part is closer to the light source than the second part, the size of the first pattern in the first part is smaller than that of the first pattern in the second part.

13. The double-sided display device as claimed in claim 4, wherein the density of the first pattern in the first part is smaller than that of the first pattern in the second part.

14. The double-sided display device as claimed in claim 9, wherein a haze of the second diffusion sheet is between 90% and 97%.

15. The double-sided display device as claimed in claim 7, further comprising a third diffusion sheet arranged on the side surface.

16. The double-sided display device as claimed in claim 9, wherein the first prism structure has a plurality of first strip structures, the second prism structure has a plurality of second strip structures, an extending direction of the first strip structures is different from that of the second strip structures.

17. The double-sided display device as claimed in claim 9, wherein the optical element is a prism film.

18. The double-sided display device as claimed in claim 6, wherein a first optical film set is included between the first diffusion sheet and the first panel.

19. The double-sided display device as claimed in claim 9, wherein a second optical film set is included between the second diffusion sheet and the second panel.

* * * * *